US006942353B2

United States Patent
Yamada et al.

(10) Patent No.: US 6,942,353 B2
(45) Date of Patent: Sep. 13, 2005

(54) BACKLIGHT UNIT AND LIQUID CRYSTAL DISPLAY APPARATUS

(75) Inventors: Katsuaki Yamada, Kashihara (JP); Kenichi Iwamoto, Ise (JP); Yoshiki Takata, Taki-gun (JP); Kentaroh Aoki, Matsusaka (JP); Yuhsuke Ohta, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 20 days.

(21) Appl. No.: 10/668,202

(22) Filed: Sep. 24, 2003

(65) Prior Publication Data

US 2004/0062030 A1 Apr. 1, 2004

(30) Foreign Application Priority Data

Sep. 25, 2002 (JP) ......................................... 2002-279266

(51) Int. Cl.[7] .................................................. F21V 7/04
(52) U.S. Cl. ......................................... 362/31; 362/225
(58) Field of Search ............................. 362/31, 27, 223, 362/225

(56) References Cited

U.S. PATENT DOCUMENTS 5,438,484 A * 8/1995 Kanda et al. .................. 362/31
5,450,292 A * 9/1995 Yokoyama et al. ........... 362/31

FOREIGN PATENT DOCUMENTS

JP          4-329520 A      11/1992
JP          2001-350026 A   12/2001

* cited by examiner

*Primary Examiner*—Ali Alavi
(74) *Attorney, Agent, or Firm*—Birch, Stewart, Kolasch & Birch, LLP.

(57) ABSTRACT

A backlight unit a light source for originating light; a light guide plate including incident portions through which light originated form the light source enters and an emitting portion form emitting the entered light; and a chassis including a first recessed portion having a first depth and on which the light source is located and a second recessed portion having a second depth deeper than the first depth and a sice adjusted for the light guide plate and on which the light guide plate is located.

9 Claims, 4 Drawing Sheets

BACKLIGHT UNIT AND LIQUID CRYSTAL DISPLAY APPARATUS

CROSS-REFERENCE TO RELATED APPLICATION

This Nonprovisional application claims priority under 35 U.S.C. §119(a) on Patent Application No. 2002-279266 filed in Japan on Sep. 25, 2002, the entire contents of which are hereby incorporated by reference.

BACKGROUND OF THE INVENTION

1. Field of the Invention

The present invention relates to a backlight unit and a liquid crystal display apparatus. More specifically, the present invention relates to a backlight unit provided precisely underneath a display device such as a liquid crystal panel for illuminating the display device with light and a liquid crystal display apparatus comprising the backlight unit.

2. Description of the Related Art

Conventionally, in a liquid crystal panel, a pair of substrates is filled with a liquid crystal. A voltage is applied between a plurality of pixel electrodes arranged in a matrix on one of the pair of the substrates and an opposed electrode provided on the other substrate so as to oppose the pixel electrodes. Thus, the alignment of the liquid crystal between each of the pixel electrodes and the opposed electrode is changed, thereby changing a light transmittance of a pixel portion corresponding to the pixel electrode.

In the liquid crystal display apparatus, a backlight unit provided on the rear surface side of the liquid crystal panel illuminates a liquid crystal panel with light. Thus, an image is displayed through the liquid crystal panel which includes pixel portions having changeable light transmittances.

As the backlight unit, a backlight unit of the edge light system using a light guide plate is widely used. In the backlight unit of the edge light system, a light guide plate is provided on the rear surface side of a liquid crystal panel so as to face the liquid crystal panel. The liquid crystal panel is illuminated with light originated from a linear light source such as a fluorescent tube provided on a side surface (edge) side of the light guide plate and guided to an entire surface of the liquid crystal panel by the light guide plate.

FIG. 3 is a cross-sectional view of a conventional liquid crystal display apparatus showing the schematic configuration of the major parts thereof.

As shown in FIG. 3, a liquid crystal display apparatus 101 comprises a liquid crystal panel 102, and a backlight unit 103 which is provided on the rear surface side of the liquid crystal panel 102.

The backlight unit 103 includes a light source 104, reflectors 105, a light guide plate 106, a reflection sheet 107, a chassis 108 and an optical sheet 109.

The light source 104 comprises a pillar shape fluorescent lamp (or a light emitting diode) as a linear light source. The light source 104 is provided along side surfaces of the light guide plate 106.

Each of the reflectors 105 has a U-shaped cross-section with an opening facing a side surface of the light guide plate 106. The reflectors 105 are provided along the side surfaces of the light guide plate 106 such that they surround the light source 104. The light from the light source 104 is reflected by each of the reflectors 105 and guided toward a side surface of the light guide plate 106.

The light guide plate 106 is configured such that the light from the light source 104 and the reflectors 105 enters through a side surface, propagates inside, and is emitted from a front surface, which serves as an emitting portion, toward the liquid crystal panel 102. The light guide plate 106 serves as a planar light source.

The reflection sheet 107 is provided on the rear surface side of the light guide plate 106. The reflection sheet 107 reflects light emitted from the rear surface of the light guide plate 106 so that the light goes back through the light guide plate 106 toward the liquid crystal panel 102.

The chassis 108 has a concave shape, which houses the light source 104, the reflectors 105, the light guide plate 106, the reflection sheet 107 and the like.

The optical sheet 109 is provided on the front surface side of the light guide plate 106. Thus, the liquid crystal panel 102 can be uniformly irradiated with light emitted from the light guide plate 106 to the liquid crystal panel 102.

Conventionally, a backlight unit including two lamps as a light source, which are located such that light enters from all of the four side surfaces of the light guideplate 106, has been known (see, for example, Japanese Laid-Open Publication No. 4-329520). With such a structure, an amount of light which enters the light guide plate 106 from the light source in the liquid crystal display apparatus 101 can be increased.

FIG. 4 is a plan view of the structure of the backlight unit 103 shown in FIG. 3, as viewed from the emitting portion side.

The cross-sectional view of the liquid crystal display apparatus 101 shown in FIG. 3 corresponds to a cross section of the backlight unit 103 taken along line X'-Y' of FIG. 4.

As shown in FIG. 4, the backlight unit 103 comprises two L-shape fluorescent lamps each extending over two of the side surfaces of the light guide plate 106 having a rectangular shape. The reflectors 105 are located so as to surround the fluorescent lamps.

In the structure described above, light enters from all of the four side surfaces of the light guide plate 106. Thus, compared to a structure in which straight-tube shape fluorescent lamps are located along two of the side surfaces of the light guide plate 106, an amount of light which enters the light guide plate 106 can be significantly increased.

In the conventional backlight unit 103, each of the two L-shape fluorescent lamps is located so as to extend over two of the side surfaces of the light guide plate 106 such that light enters from all of the four side surfaces of the light guide plate 106. Thus, the light guide plate 106 cannot be fixed to the chassis 108. Therefore, if a shock is given to the light guide plate 106 in a vertical or horizontal direction, the light guide plate 106 may directly contact a fluorescent lamp, i.e., the light source 104.

In order to prevent such a problem in the backlight unit 103, as shown in FIG. 4, the lengths of the L-shape fluorescent lamps are shortened to provide pillar shape light guide plate fixing members 110 for supporting the light guide plate 106 on two diagonal corners of the light guide plate 106. Thus, there is a problem that an amount of light entering the light guide plate 106 from the L-shape fluorescent lamps becomes smaller. The backlight unit 103 of a high luminance cannot be achieved.

If the fluorescent lamps are shortened in order to facilitate supporting the light guide plate 106, light does not enter from a portion of the side surfaces of the light guide plate 106 which the fluorescent lamps do not face. Thus, there is another problem that display is dark in corners of a display area of a screen of the liquid crystal panel 102.

There is still another problem that additional cost and processes are required to form the light guide plate fixing members 110.

SUMMARY OF THE INVENTION

According to one aspect of the present invention, there is provided a backlight unit comprising: a light source for originating light; a light guide plate including incident portions through which light originated from the light source enters and an emitting portion for emitting the entered light; and a chassis including a first recessed portion having a first depth and on which the light source is located and a second recessed portion having a second depth deeper than the first depth and a size adjusted for the light guide plate and on which the light guide plate is located.

In one embodiment of the present invention, the light source may be a linear light source.

In one embodiment of the present invention, the light guide plate may include a first side surface, a second side surface, a third side surface, and a fourth side surface, and light originated from the light source may enter through the first side surface, the second side surface, the third side surface, and the fourth side surface.

In one embodiment of the present invention, the light source may include a first L-shape fluorescent lamp and a second L-shape fluorescent lamp, light originated from the first L-shape fluorescent lamp may enter through the first side surface and the second side surface, and light originated from the second L-shape fluorescent lamp may enter through the third side surface and the fourth side surface.

In one embodiment of the present invention, the light source may include a U-shape fluorescent lamp and a straight tube-shape fluorescent lamp, light originated from the U-shape fluorescent lamp may enter through the first side surface, the second side surface and the third side surface, and light originated from the straight tube-shape fluorescent lamp may enter through the fourth side surface.

In one embodiment of the invention, the light source may include an O-shape fluorescent lamp, and light originated from the O-shape fluorescent lamp may enter through the first side surface, the second side surface, the third side surface and the fourth side surface.

In one embodiment of the present invention, the light source may include a first straight tube-shape fluorescent lamp, a second straight tube-shape fluorescent lamp, a third straight tube-shape fluorescent lamp and a fourth straight tube-shape fluorescent lamp, light originated from the first straight tube-shape fluorescent lamp may enter through the first side surface, light originated from the second straight tube-shape fluorescent lamp enters through the second side surface, light originated from the third straight tube-shape fluorescent lamp may enter through the third side surface, and light originated from the fourth straight tube-shape fluorescent lamp may enter through the fourth side surface.

In one embodiment of the present invention, the first recessed portion may be provided so as to surround the second recessed portion.

According to another aspect of the present invention, there is provided a liquid crystal display apparatus comprising: a liquid crystal panel; and a backlight unit for illuminating the liquid crystal panel with light, wherein the backlight unit includes: a light source for originating light; a light guide plate including incident portions through which light originated from the light source enters and an emitting portion for emitting the entered light; and a chassis including a first recessed portion having a first depth and on which the light source is located and a second recessed portion having a second depth deeper than the first depth and a size adjusted for the light guide plate and on which the light guide plate is located.

Now, the effects of the above-described structure of the present invention is described.

The liquid crystal display apparatus according to the present invention comprises a first recessed portion of a chassis and also a second recessed portion having a size adjusted for a light guide plate and a depth deeper than that of the first recessed portion. The light guide plate is located in the second recessed portion of the chassis. A part of the light guide plate opposed to an emitting portion is fitted into and held by the second recessed portion. The side surfaces of the second recessed portion of the chassis are in contact with lower portions of the side surfaces of the light guide plate, thereby holding the light guide plate with respect to vertical and horizontal directions.

Therefore, it is not necessary to shorten fluorescent lamps to provide pillar shape light guide plate fixing members for fixing the light guide plate with respect to vertical and horizontal directions in corners as in the conventional apparatus. According to such a structure, the fluorescent lamps can be made long to increase an amount of light from the light source. A planar light source having a high luminance can be achieved.

Thus, the invention described herein makes possible the advantage of providing a backlight unit having a high luminance with a light guide plate held in position and a liquid crystal display apparatus using the backlight unit.

These and other advantages of the present invention will become apparent to those skilled in the art upon reading and understanding the following detailed description with reference to the accompanying figures.

DETAILED DESCRIPTION

Hereinafter, examples of the liquid crystal display apparatus using the backlight unit according to the present invention will be described with reference to the drawings.

Figure 1:
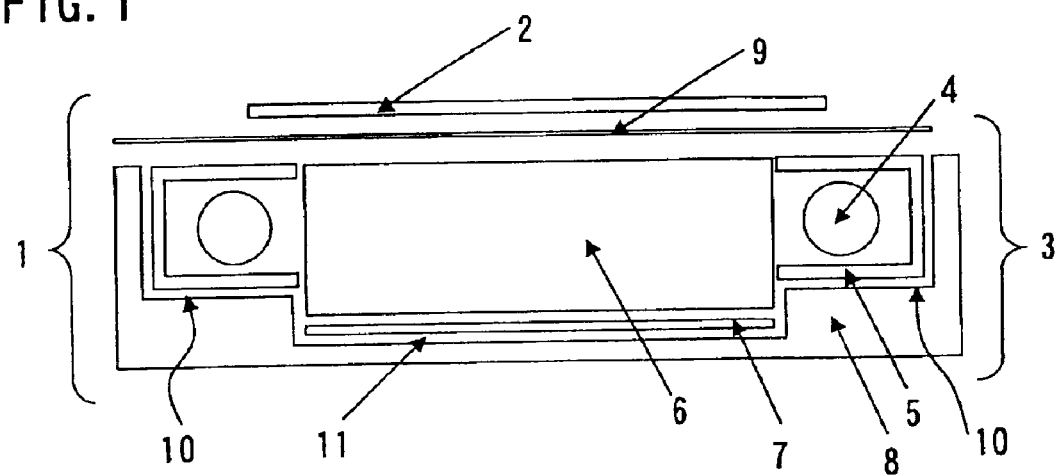
FIG. 1 is a cross-sectional view of a liquid crystal display apparatus according to an example of the present invention, showing the schematic configuration of the major parts thereof.
Figure 2:
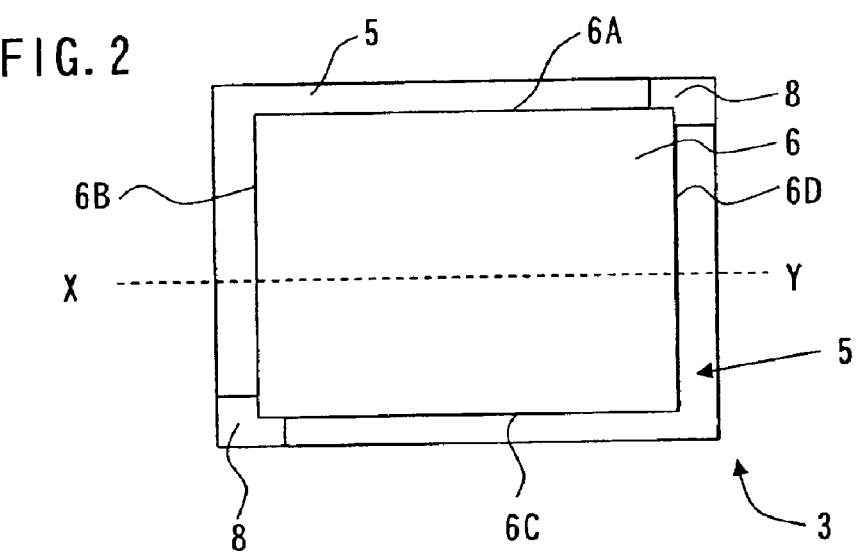
FIG. 2 is a plan view of the configuration of the major parts of the backlight of FIG. 1, as viewed from a light emitting surface side.
Figure 3:
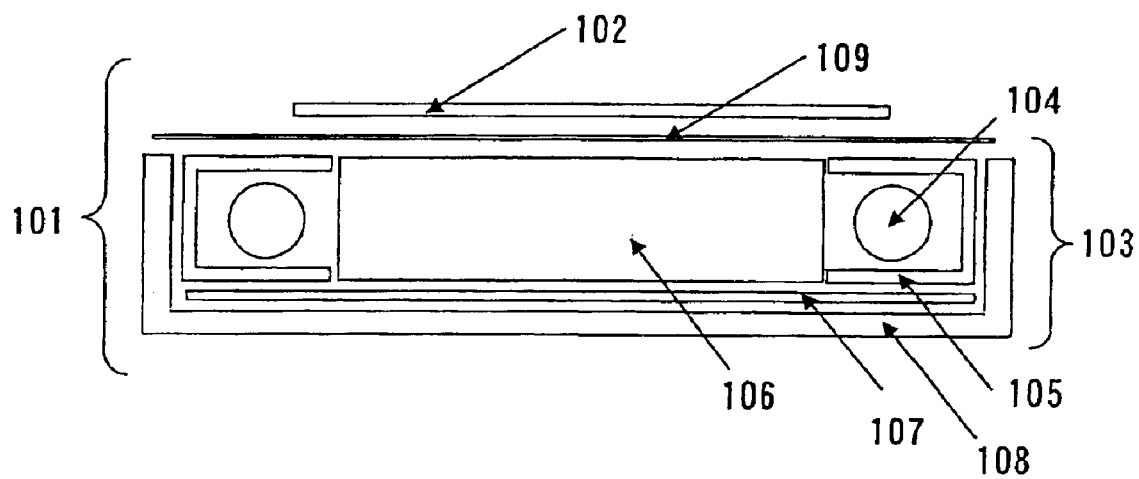
FIG. 3 is across-sectional view of a conventional liquid crystal display apparatus showing the schematic configuration of the major parts thereof.

FIG. 1 is a cross-sectional view of a liquid crystal display apparatus according to an example of the present invention, showing the schematic configuration of the major parts thereof. FIG. 2 is a plan view of configuration of the major parts of the backlight unit of FIG. 1, as viewed from a light emitting surface side. The cross-sectional view shown in FIG. 1 corresponds to a cross section of a backlight unit 3 taken along line X-Y of FIG. 2.

As shown in FIGS. 1 and 2, a liquid crystal display apparatus 1 comprises a liquid crystal panel 2, and a backlight unit 3 which is provided on the rear surface side of the liquid crystal panel 2 and irradiates the liquid crystal panel 2 with light.

In the liquid crystal panel 2, a pair of substrates is filled with a liquid crystal. A voltage is applied between a plurality of pixel electrodes arranged in a matrix on one of the pair of the substrates and an opposed electrode provided on the other substrate so as to oppose the pixel electrodes. Thus, the alignment of the liquid crystal between each of the pixel electrodes and the opposed electrode is changed, thereby changing a light transmittance of a pixel portion corresponding to the pixel electrode. An image is displayed by illuminating the liquid crystal panel 2 with light from the backlight unit 3 located on the rear surface side of the liquid crystal panel 2.

The backlight unit 3 comprises light source 4 for originating light, reflectors 5 for reflecting light originated from the light source 4 to side surfaces of a light guide plate 6, the light guide plate 6 for emitting light from a surface to the liquid crystal panel 2, a reflection sheet 7 for reflecting light emitted from the rear surface of the light guide plate 6 toward the liquid crystal panel 2, a chassis 8, and an optical sheet 9.

A pillar shape fluorescent lamp (or a light emitting diode) as a linear light source is bent to form an L-shape fluorescent lamp. As the light source 4, two L-shape fluorescent lamps are provided along the side surfaces, extending over two of the side surfaces of the light guide plate 6. Specifically, one L-shape fluorescent lamp is located so as to extend over a side surface 6A and a side surface 6B. The other L-shape fluorescent lamp is located so as to extend over a side surface 6C and a side surface 6D.

Each of the reflectors 5 has a cross-section of a U-shape with an opening which faces a side surface of the light guide plate 6. The reflectors 5 are located along the side surfaces of the light guide plate 6 such that they surround the light source 4. The light from each of the light source 4 is reflected by each of the reflectors 5 and guided toward a side surface of the light guide plate 6. Similar to the light source 4, the reflectors 5 are formed into the L-shape, as viewed from above.

In the present example, the reflectors 5 are formed using SUS 430 (stainless material) having a thickness of 0.2 mm. A reflection material, E60V available from Toray Industries, Inc. is attached on a surface of the reflectors 5 facing the light guide plate 6 (the inner side of the cross-section of U-shape). Any material may be used for the reflectors 5 as long as it is sufficiently strong. A material having a high reflectance with respect to light of a wavelength in the visible region for the reflectors 5 may be used. The reflectors 5 may be metal reflectors having an inner surface finished like a mirror.

The light guide plate 6 is configured such that the light from the light source 4 and the reflectors 5 enters through a side surface (an incident portion), propagates inside, and is emitted from a broad surface (an emitting portion) on the side facing the liquid crystal panel 2. Thus, the light guide plate 6 serves as a planar light source.

The light guide plate 6 has a rectangular parallelepiped shape, i.e., four side surfaces and two opposing broad surfaces. The four side surfaces serve as incident portions through which light enters into the light guide plate 6. Among the two opposing broad surfaces, the one facing the liquid crystal panel 2 serves as an emitting portion through which light is emitted from the light guide plate 6.

The reflection sheet 7 is provided on the rear surface side of the light guide plate 6. The reflection sheet 7 reflects light emitted from the rear surface of the light guide plate 6 so that light goes back through the light guide plate 6 toward the liquid crystal panel 2.

The chassis 8 is formed of a white resin. As shown in FIG. 1, the chassis 8 has a concave shape with two steps. On a first step, the light source 4 and the reflectors 5 are housed. On the second step, the light guide plate 6 and the reflection sheet 7 are housed. The light source 4 and the reflectors 5 are located on the first step such that they surround the light guide plate 6.

Specifically, the chassis 8 has a deeper concave portion having a size adjusted for the light guide plate 6 (a recessed portion 11, i.e., the inside of the second step) on a bottom surface. A portion opposing the emitting portion of the light guide plate 6 is fitted in the recessed portion 11 and held thereby. The chassis 8 has a shallower concave portion (a recessed portion 10 provided to surround the recessed portion 11, i.e., the inside of the first step). The light source 4 and the reflectors 5 are located in the recessed portion 11 and held between the light guide plate 6 and the chassis 8. As shown in FIG. 2, each of the reflectors 5 has an L-shape, as viewed from above, and located in the recessed portion 10 of the chassis 8 along two adjacent side surfaces of the light guide plate 6 so as to surround it.

In the present example, the light guide plate 6 having a thickness of 5 mm is used. On the bottom surface of the chassis 8, the recessed portion 11 having a depth of 1 mm and a size adjusted for the light guide plate 6. The light guide plate 6 is located with a part thereof inserted into the recessed portion 11. Thus, portions corresponding to a thickness of 4 mm of the side surfaces of the light guide plate 6 serve as the incident portion, through which light from the fluorescent lamps enters therein.

The optical sheet 9 is provided on the front surface side of the chassis 8. Thus, the liquid crystal panel 2 can be uniformly irradiated with light emitted from the light guide plate 6 to the liquid crystal panel 2.

In the backlight unit 3 according to the present example having the above-described structure, the two L-shape fluorescent lamps are located so as to respectively extend over two side surfaces of the light guide plate 6 such that light enters through all the four side surfaces of the light guide plate 6 and the light guide plate 6 can be held by the recessed portion 11 of the chassis 8. Thus, the conventional problem that when a shock in a vertical/horizontal direction is given, the light guide plate 6 directly contacts and breaks the fluorescent lamps does not occur.

Figure 4:
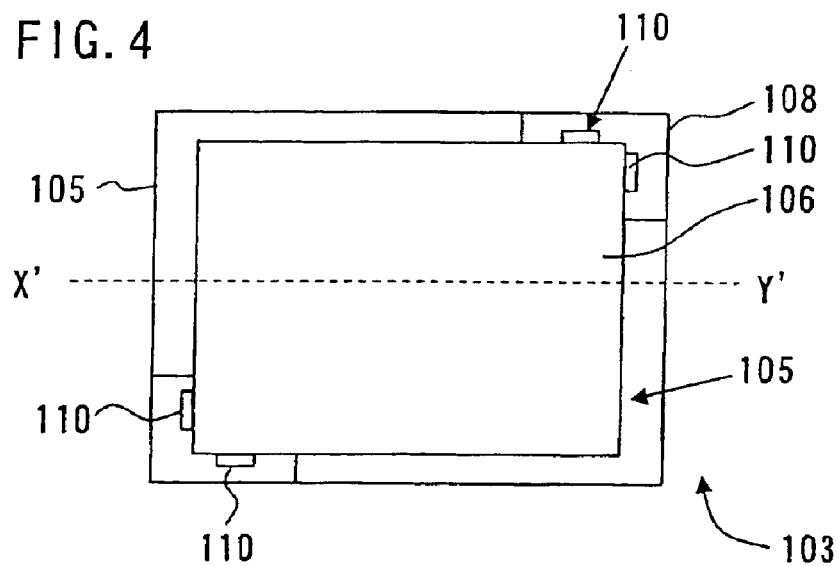
FIG. 4 is a plan view of the configuration of the major parts of the conventional backlight unit, as viewed from the emitting portion side.

Further, in the backlight unit 3 according to the present example, it is not necessary to shorten the L-shape fluorescent lamps to provide the pillar shape light guide plate fixing members 110 for supporting the light guide plate 106 as in the conventional back light unit 103 shown in FIG. 4. Thus, a backlight unit having a high luminance can be achieved. Also, since it is not necessary to shorten the fluorescent lamps, display in corners of a display area on a screen of the liquid crystal panel 2 is not dark.

In the conventional backlight unit 103 shown in FIG. 4, the pillar shape light guide fixing members 110 are located in portions where the fluorescent lamps do not reach in order to fix the light guide plate 106. In this method, some of the pillars are overloaded. Thus, large light guide fixing members 110 are necessary. On the other hand, in the backlight unit 3 according to the present example, all the side surfaces of the recessed portion 11 of the chassis 8 presses and holds the light guide plate 6 from four directions. Thus, the pressure applied by the weight of the light guide plate 6 is distributed to improve a holding strength.

Hereinafter, the mechanism of improving the holding strength of the light guide plate will be described.

Herein, in general, a pressure is calculated as follows:

$$\text{Pressure}=\text{load}(N) \div \text{area}(m^2).$$

Herein, load=mass×g, and g is acceleration due to gravity.

For example, the case of a 15-inch acryl light guide plate (310×210×5 mm) is considered. The density of acryl is 1.19. Thus, the mass of the light guide plate is about 387 g. In the backlight unit 3 according to the present example, if the light guide plate 6 is supported by one of a pair of short sides of the recessed portion 11 of the chassis 8 with a depth of 1 mm, the pressure is calculated as follows:

$$387 \text{ g} \div (21 \text{ cm} \times 0.1 \text{ cm}) = 1843 \text{ g N}/m^2.$$

Now, the case where the light guide plate 106 is supported by providing the light guide plate fixing members 110 as shown FIG. 4 without providing the recessed portion on the bottom surface of the chassis 8 is considered. In order to have an area equal to that of the incident portion of the light guide plate 106, it is assumed that a light guide plate having a thickness of 4 mm is used. The weight of the light guide plate of 310×210×4 mm is about 310 g. To give a pressure of 1843 g N/$m^2$, light guide plate fixing members 110 having areas of 42×4 mm are required. Thus, the fluorescent lamps cannot be located along 42 mm of the length of the side surfaces of the light guide plate.

In the backlight unit 3 according to the present example, if the light guide plate 6 is supported by one of a pair of long sides of the recessed portion 11 of the chassis 8, the pressure is calculated as follows:

$$387 \text{ g} \div (31 \text{ cm} \times 0.1 \text{ cm}) = 1248 \text{ g N}/m^2.$$

To give a pressure of 1248 g N/$m^2$ in the case where the light guide plate 106 is supported by the light guide plate fixing members 110 as shown in FIG. 4, the light guide plate fixing members 110 having areas of 62×4 mm are required. Therefore, the fluorescent lamps cannot be located along the 62 mm of the length of the side surfaces of the light guide plate.

The area of the incident portion of the light guide plate is calculated from the above results.

In the present example, the area of the side surfaces of the light guide plate 6 through which light enters from the light source 4 is calculated as follows:

$$(310 \times 4 \text{ mm}) \times 2 \text{ sides} + (210 \times 4 \text{ mm}) \times 2 \text{ sides} = 4160 (mm^2).$$

In the case where the light guide plate 106 is supported by the light guide plate fixing members 110 as shown in FIG. 4, the area of the side surfaces of the light guide plate 106 through which light enters from the light source 104 is calculated as follows:

$$\{(310-62) mm \times 4 \text{ mm} \times 2 \text{ sides}) + (210-42) mm \times 4 \text{ mm} \times 2 \text{ sides}\} = 3328 (mm^2).$$

The ratio between these two values is as follows:

$$4160 (mm^2) \div 3328 (mm^2) = 1.25.$$

According to the present example, it is not necessary to provide the light guide plate fixing members 110 in order to fix the light guide plate 6. Thus, there is no reduction in the substantial area of the incident portion of the light guide plate 6, i.e., the area of the incident portion is 1.25 times as large as the conventional case. The backlight unit 3 having a high luminance can be achieved.

As described above, a liquid crystal display apparatus 1 according to the present example comprises the light guide plate 6 through which light entering from four side surfaces propagates and is emitted from one of the broad surfaces, the light source 4 located near and along the side surfaces, and the chassis 8 for housing the optical members composing the backlight unit 3. The recessed portion 11 having a size adjusted for the light guide plate 6 is provided on the bottom surface of the chassis 8 and a part of a lower side of the light guide plate 6 is fitted in the recessed portion 11. With such a structure, the side surfaces of the recessed portion 11 of the chassis 8 are in contact with the lower portions of the side surfaces of the light guide plate 6 and hold the light guide plate 6 with respect to the vertical and horizontal directions. Thus, it is not necessary to shorten the fluorescent lamps and provide the pillar shape fixing members for fixing the light guide plate 6 with respect to the vertical and horizontal directions as in the conventional case. It is possible to hold the light guide plate 6 without shortening the light source unlike the conventional case. Light enters from all of the four side surfaces, and thus, an amount of light can be increased.

An example having each one of the two L-shape fluorescent lamps respectively extending over two of the side surfaces of the light guide plate 6 has been described above. However, the present invention is not limited thereto.

Figure 5:
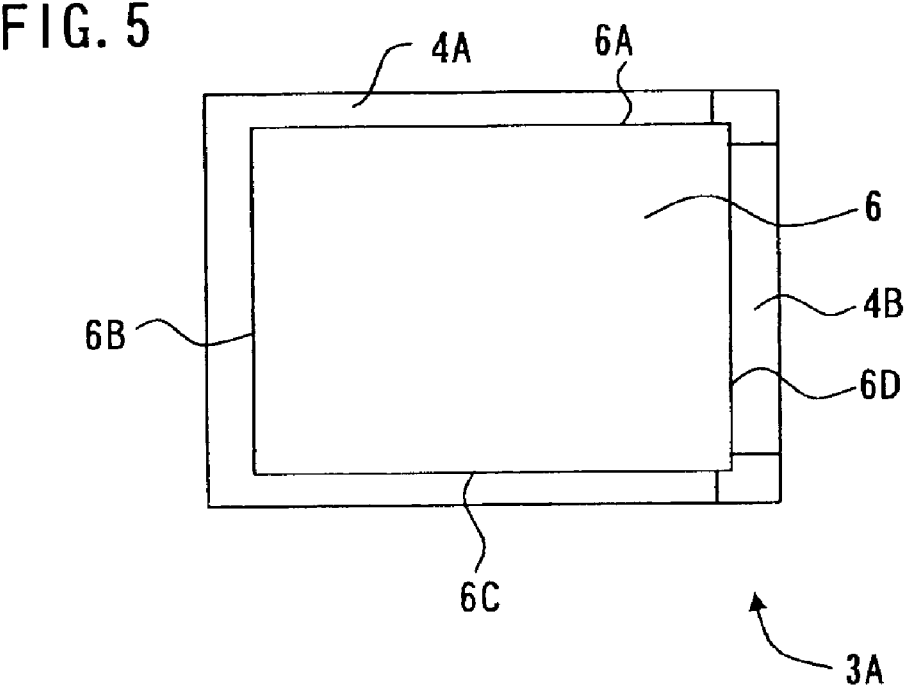
FIG. 5 is a plan view of the configuration of the major parts of a backlight unit according to another example of the present invention, as viewed from an emitting portion side.

FIG. 5 is a plan view of configuration of the major parts of a backlight unit 3A according to another example of the present invention, as viewed from a light emitting surface side. In FIG. 5, the reflectors 5 are omitted in order to show the shape of the light source and the relationship between the light source and the corresponding side surfaces.

In the backlight unit 3A shown in FIG. 5, an U-shape fluorescent lamp 4A is provided so as to extend over three of the side surfaces of the light guide plate 6 (i.e., side surfaces 6A, 6B, and 6C) and a straight-tube shape lamp 4B is located on the other one side surface of the light guide plate 6 (i.e., a side surface 6D).

Figure 6:
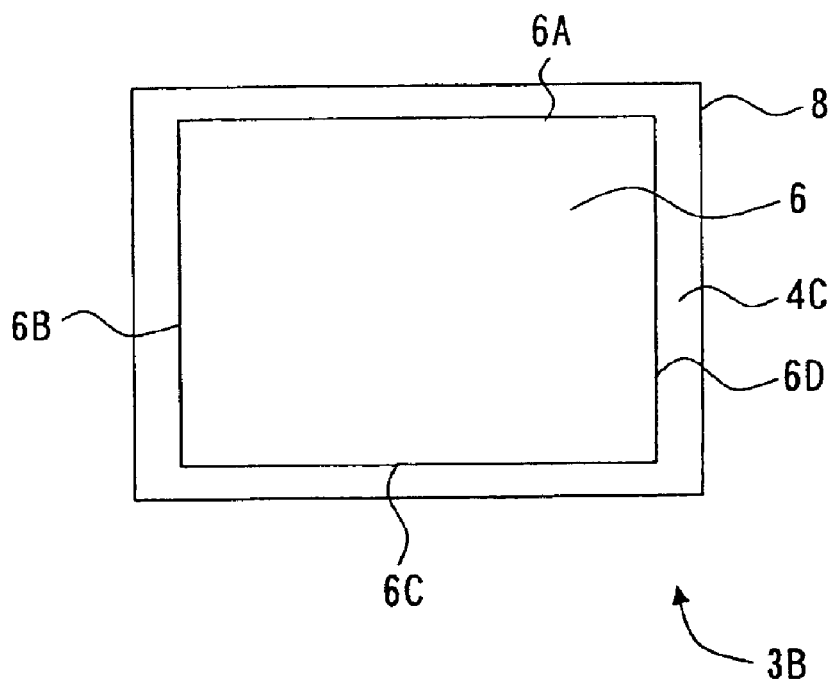
FIG. 6 is a plan view of the configuration of the major parts of backlight unit according to still another example of the present invention, as viewed from an emitting portion side.

FIG. 6 is a plan view of configuration of the major parts of a backlight unit 3B according to still another example of the present invention, as viewed from a light emitting surface side. The reflectors 5 are also omitted in FIG. 6, in order to show the shape of the light source and the relationship between the light source and the corresponding side surfaces.

In the backlight unit 3B shown in FIG. 6, an O-shape fluorescent lamp 4C is provided so as to surround all the four side surfaces of the light guide plate 6 (i.e., side surfaces 6A, 6B, 6C, and 6D).

Figure 7:
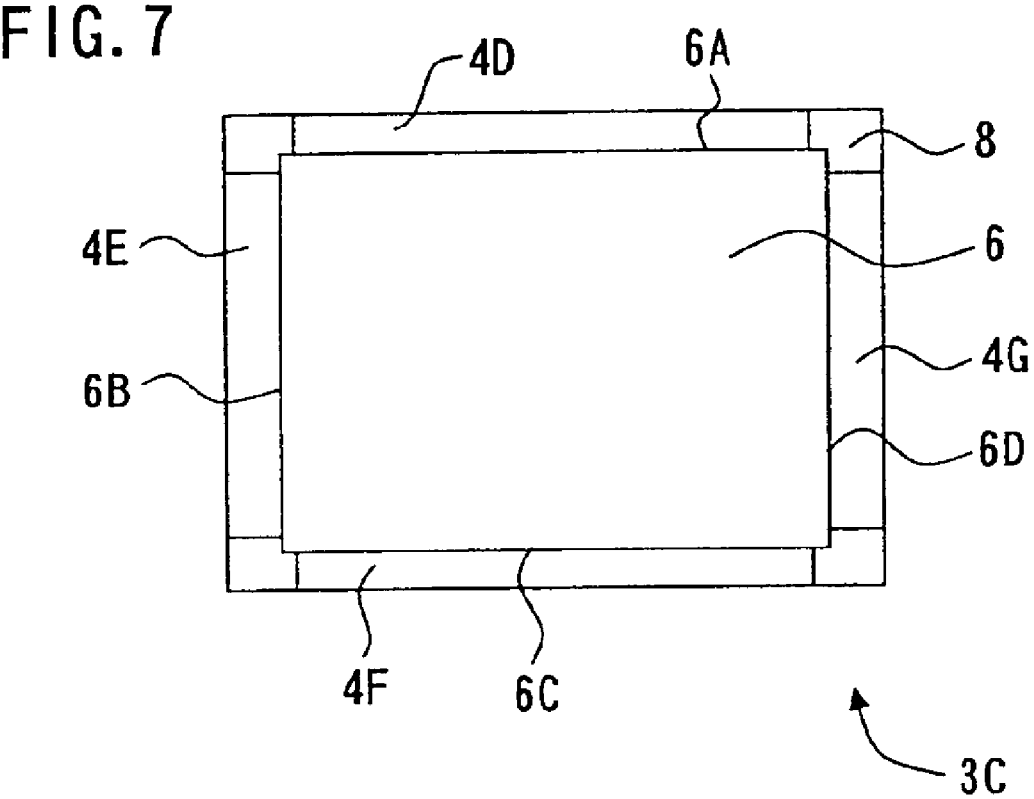
FIG. 7 is a plan view of the configuration of the major parts of a backlight unit according to yet another example of the present invention, as viewed from an emitting portion side.

FIG. 7 is a plan view of the configuration of the major parts of a backlight unit 3C according to yet another example of the present invention, as viewed from a light emitting surface side. The reflectors 5 are also omitted in FIG. 7, in order to show the shape of the light source and the relationship between the light source and the corresponding side surfaces.

In the backlight unit 3C shown in FIG. 7, four straight-tube shape fluorescent lamps 4D, 4E, 4F and 4G are provided so as to face each of the four side surfaces of the light guide plate 6 (i.e., side surfaces 6A, 6B, 6C, and 6D, respectively).

As described above, the light source 4 from which light enters the side surfaces 6A, 6B, 6C, and 6D may have the shapes as shown in FIGS. 5 through 7.

In the above-described examples, the light source is a linear light source. However, the present invention is not limited thereto. A light source used in the backlight unit according to the present invention may be any light source for originating light.

In the above-described examples, the light guide plate has a shape having four side surfaces. However, the present invention is not limited thereto. The light guide plate used in the backlight unit according to the present invention may have any shape as long as it has an incident portion and an emitting portion.

As described above, according to the present invention, by providing in a chassis the first recessed portion and the second recessed portion, having a size adjusted for a light guide plate and depth deeper than that of the first recessed portion, a part of the light guide plate which is opposed to an emitting portion of the light guide plate is fitted into the second recessed portion of the chassis and it is possible to hold the light guide plate with respect to the vertical and horizontal directions.

In the conventional backlight unit, pillar shape light guide fixing members are provided where a light source is not located to fix the light guide plate. The load applied to the pillar shape light guide fixing members is large, and thus big light guide fixing members are required. In the present invention, the side surfaces of the light guide plate are pressed by the side surfaces of the recessed portion of the chassis to hold the light guide plate. Thus, the pressure applied by the weight of the light guide plate is distributed to improve a holding strength.

Further, according to the present invention, it is not necessary to shorten the linear light source such as a fluorescent lamp to provide light guide plate fixing members for supporting the light guide plate as in the conventional backlight unit. Thus, the substantial area of an incident portion of side surfaces of the light guide plate can be large and a backlight unit having a high luminance can be achieved. Since there is no need to shorten the linear light source such as the fluorescent lamp, the conventional problem that display in corners of the display area of the screen of the liquid crystal panel is dark does not occur. High definition display can be achieved.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A backlight unit comprising:
   a light source for originating light;
   a light guide plate including incident portions through which light originated from the light source enters and an emitting portion for emitting the entered light; and
   a chassis including a first recessed portion having a first depth and on which the light source is located and a second recessed portion having a second depth deeper than the first depth and a size adjusted for the light guide plate and on which the light guide plate is located.

2. A backlight unit according to claim 1, wherein the light source is a linear light source.

3. A backlight unit according to claim 1, wherein the light guide plate includes a first side surface, a second side surface, a third side surface, and a fourth side surface, and light originated from the light source enters through the first side surface, the second side surface, the third side surface, and the fourth side surface.

4. A backlight unit according to claim 3, wherein the light source includes a first L-shape fluorescent lamp and a second L-shape fluorescent lamp, light originated from the first L-shape fluorescent lamp enters through the first side surface and the second side surface, and light originated from the second L-shape fluorescent lamp enters through the third side surface and the fourth side surface.

5. A backlight unit according to claim 3, wherein the light source includes a U-shape fluorescent lamp and a straight tube-shape fluorescent lamp, light originated from the U-shape fluorescent lamp enters through the first side surface, the second side surface and the third side surface, and light originated from the straight tube-shape fluorescent lamp enters through the fourth side surface.

6. A backlight unit according to claim 3, wherein the light source includes an O-shape fluorescent lamp, and light originated from the O-shape fluorescent lamp enters through the first side surface, the second side surface, the third side surface and the fourth side surface.

7. A backlight unit according to claim 3, wherein the light source includes a first straight tube-shape fluorescent lamp, a second straight tube-shape fluorescent lamp, a third straight tube-shape fluorescent lamp and a fourth straight tube-shape fluorescent lamp, light originated from the first straight tube-shape fluorescent lamp enters through the first side surface, light originated from the second straight tube-shape fluorescent lamp enters through the second side surface, light originated from the third straight tube-shape fluorescent lamp enters through the third side surface, and light originated from the fourth straight tube-shape fluorescent lamp enters through the fourth side surface.

8. A backlight unit according to claim 1, wherein the first recessed portion is provided so as to surround the second recessed portion.

9. A liquid crystal display apparatus comprising:
   a liquid crystal panel; and
   a backlight unit for illuminating the liquid crystal panel with light,
   wherein the backlight unit includes:
      a light source for originating light;
      a light guide plate including incident portions through which light originated from the light source enters and an emitting portion for emitting the entered light; and
      a chassis including a first recessed portion having a first depth and on which the light source is located and a second recessed portion having a second depth deeper than the first depth and a size adjusted for the light guide plate and on which the light guide plate is located.

* * * * *